(No Model.) 3 Sheets—Sheet 3.
A. JOHNSTON.
SCREW MACHINE.
No. 299,477. Patented May 27, 1884.
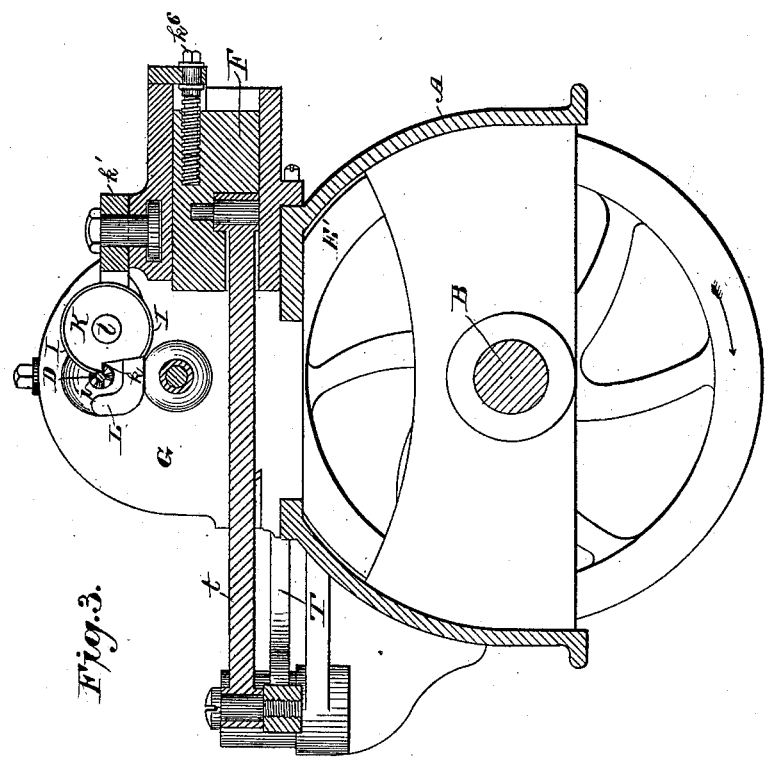
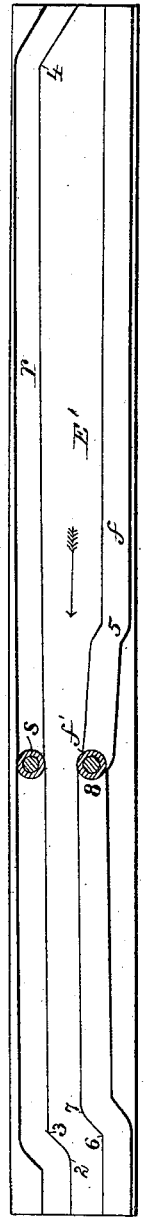
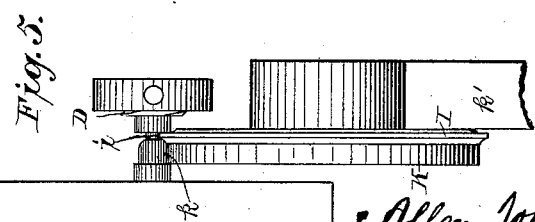
Witnesses
Wm J. Ranner
C. J. Hedrick
Inventor
Allen Johnston by
J. Toller
his attorney

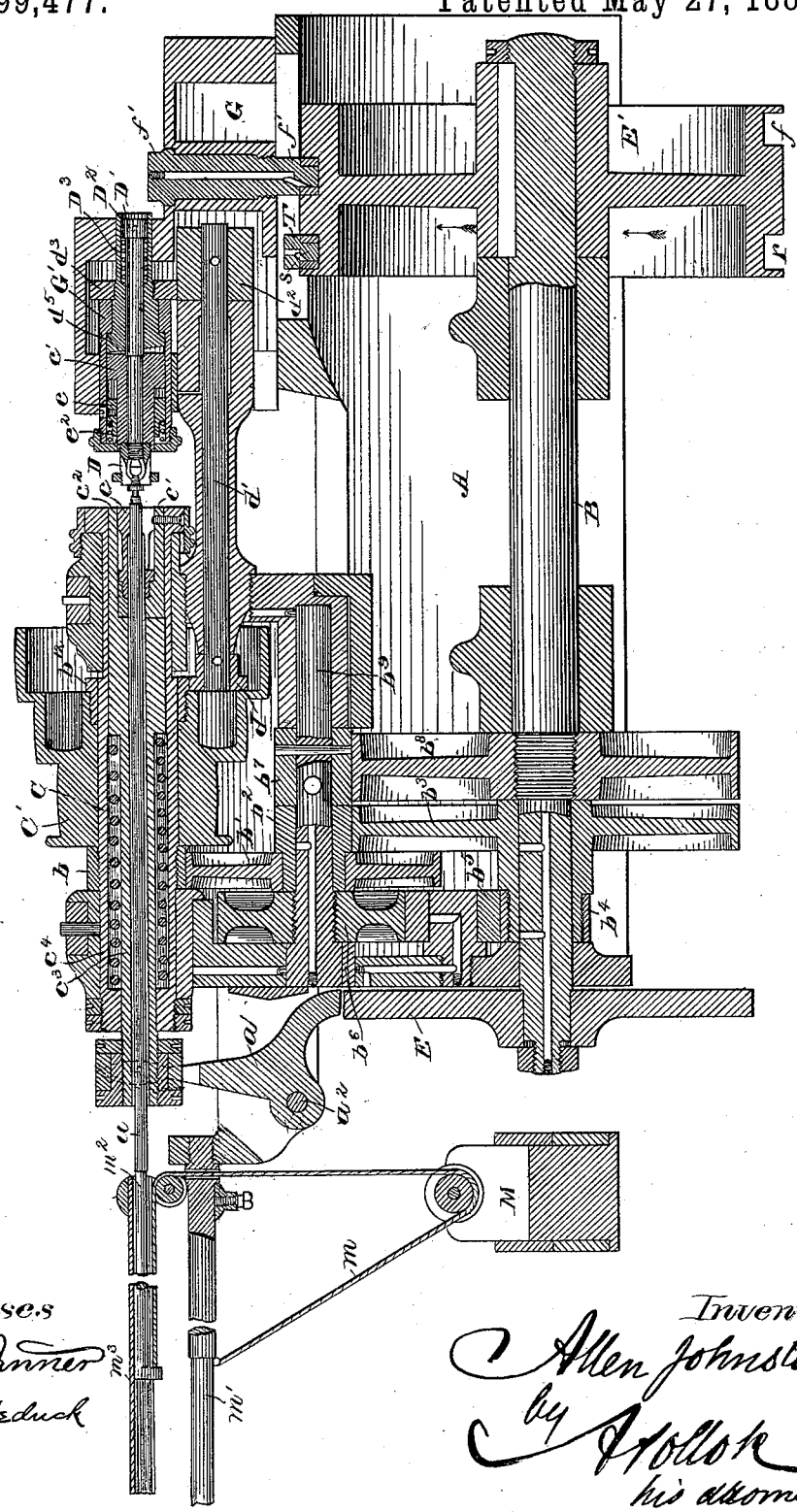

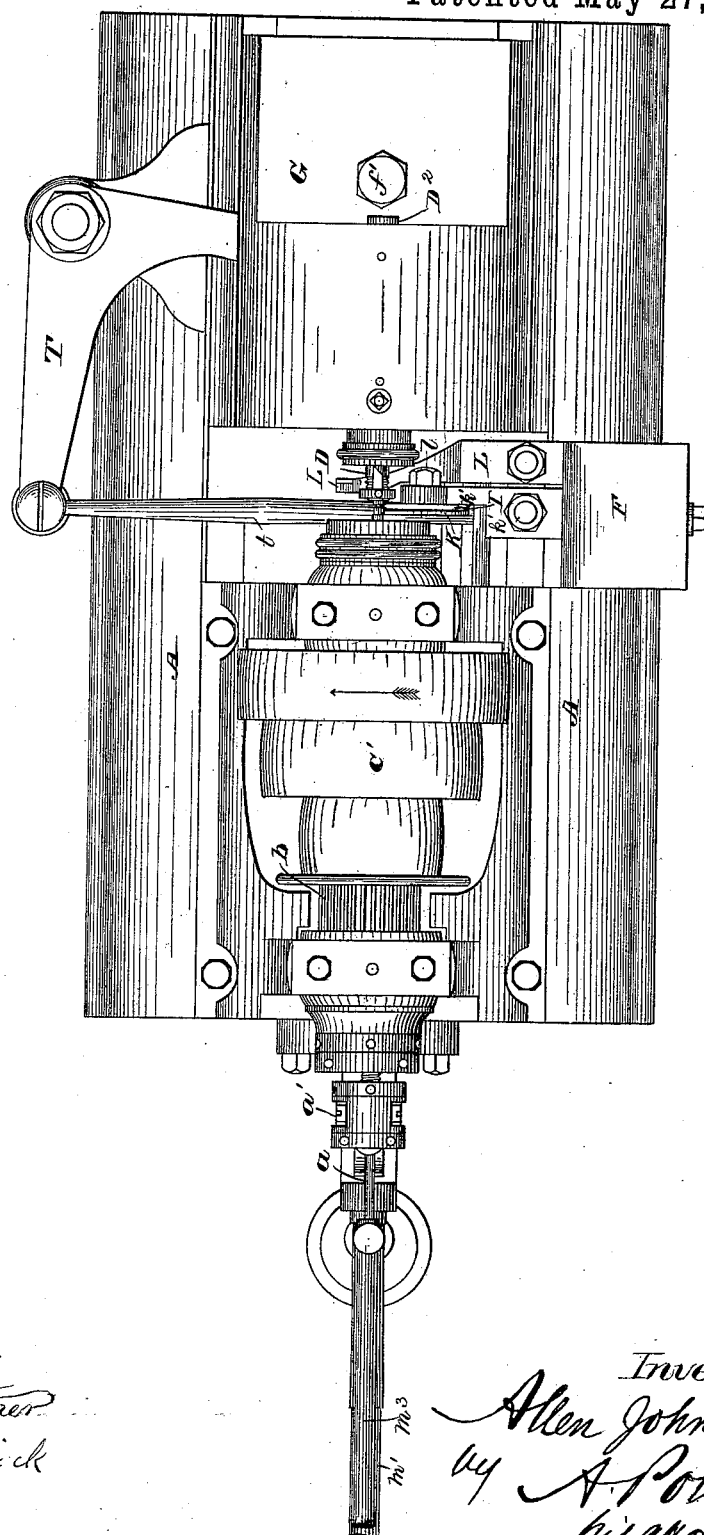

UNITED STATES PATENT OFFICE.

ALLEN JOHNSTON, OF OTTUMWA, IOWA.

SCREW-MACHINE.

SPECIFICATION forming part of Letters Patent No. 299,477, dated May 27, 1884.

Application filed January 10, 1884. (No model.)

*To all whom it may concern:*

Be it known that I, ALLEN JOHNSTON, of Ottumwa, in the county of Wapello and State of Iowa, have invented a new and useful Improvement in Screw-Machines, which improvement is fully set forth in the following specification.

This invention relates more particularly to automatic machines for manufacturing short machine-screws from a long rod or screw-stock, the said stock being automatically fed forward a screw's length, turned down and threaded, and severed, to remove the newly-formed screw; but the invention in whole or in part is applicable also to the manufacture of other screws, and of articles other than screws, and to machines which are not automatic, or only partly automatic, in their action. Ordinarily the end of the rod or screw-stock is turned down to the diameter of the shank to be made, then the turned-down portion is threaded, the die is backed off, and the newly-formed screw is severed from the rod or screw-stock, which is thereupon fed forward a screw's length, to form a new screw. Each screw is thus finished and cut off before the next succeeding one is begun.

In the present invention, in order to manufacture screws as rapidly as possible, the threading of the end of the rod which has previously been turned down is effected simultaneously with the turning down of the rod to form the shank of the succeeding screw. This simultaneous threading of one screw and turning down of a succeeding one, as well as the combination or construction and arrangement of parts which allow it to be performed, is considered new, broadly. The threading is completed and the die backed off prior to cutting off the screw. The proper feed of the rod is preferably effected by the use of a length-gage, against which the rod or screw-stock, whenever it is released from the bite of the chuck-jaws, is advanced by a weight, a spring, or equivalent device. This length-gage is carried by the carrier for the turning-down and cutting-off tools, which carrier is supported upon a stationary part of the machine, and has a transverse movement only. The novelty is in supporting the length-gage on such a carrier with one or more turning-tools, (to which class both turning-down and cutting-off tools belong.) Heretofore the length-gage has been placed with the turning-tools on a turret or a cross-slide carried by a longitudinal slide, or it has been separately supported in the machine-frame. (See my Patent No. 269,791, December 26, 1882.) By the new disposition the greater accuracy of a length-gage having a transverse movement only is secured, while at the same time the use of a separate cam for operating it is avoided.

The following is a description of what is considered the best mode of applying the principle of the invention, reference being had to the accompanying drawings.

Figure 1 is a vertical longitudinal section of a machine constructed in accordance with the invention; Fig. 2, a plan of the same; Fig. 3, a vertical cross-section; Fig. 4, a development on a plane of the cam-drum for actuating the tools; and Fig. 5, an enlarged view, in plan, of the turning-down and cutting-off tool.

A is the machine-frame, B a cam-shaft, C the chuck-spindle, and D' the die-spindle, or spindle of the threading-tool. The chuck-spindle is driven by a belt on the pulley C'. Motion is conveyed from the gear $b$ on the chuck-spindle to the cam-shaft through the gears $b'$ $b^2$, loose on the shaft $b^9$, gears $b^3$ $b^4$, loose on the shaft B, gear $b^5$, supported in an arc-limb, gears $b^6$ $b^7$, fixed to shaft $b^9$, and gear $b^8$, fixed to shaft B, or by other suitable gearing or mechanical connection. From the gear $b^{12}$ motion is conveyed to the die D and its spindle D' through the gear $d$ and shaft $d'$, gear $d^2$, and gear $d^3$, the gears $d$ and $d^2$ being keyed on the shaft $d'$ and the gear $d^3$ on a sleeve, $D^2$, surrounding the die-spindle and connected therewith by a clutch-piece, $d^5$, normally kept in engagement by a spring, $D^3$, with the clutch-piece $e'$, fixed to the die-spindle D'. The effect of the gears $b$ $d$ $d^2$ $d^3$ is to revolve the die D and the spindle D' in the same direction as the chuck, but at a somewhat greater speed. The die is brought into action while the screw-stock is held in the chuck. Being revolved faster than said chuck, it cuts the thread on the screw-stock in proportion to the difference in the velocities of rotation. In order to run the die off the newly-cut thread, the die and its spindle D' are held from turning by the non-rotating clutch-piece $e$, which surrounds the clutch-piece $e'$, and is capable of a slight forward movement against the pressure of spring $c^2$. The threading-tool (comprising the die and its connected parts) is carried by a slide, G, mounted in longitudinal ways of the machine. It is reciprocated by means of a pin, $f'$, which works in an irregular groove, $f$, in the periphery of a cam-drum, E'. This cam-drum is keyed on the shaft B. G' is a barrel, which is fixed on the slide G, and incloses the clutch-pieces $d^5$ $e$ $e'$. The clutch-piece $e$ is connected therewith by a pin working in a slot, this connection preventing rotation of the clutch-piece, but permitting to it a slight endwise movement. The gear $d^2$ does not reciprocate with the slide, but is made long, so that the gear $d^1$ is always in engagement with it. The chuck may be of any ordinary or suitable construction. As shown, the chuck-jaws $c$ are fastened at the rear end (left, Fig. 1) to a stay-piece, $c'$, fastened by screws in the end of the chuck-spindle, and the said jaws are pressed inward to grasp the rod or screw-stock $a$ by the wedges $c^2$ on the end of the tube $c^3$, which latter is pressed forward by the spring $c^4$. The tube $c^3$, with its wedges, is, at intervals, drawn back against the pressure of the spring $c^4$, to relieve the bite of the jaws $c$ on the screw-stock $a$, and allow the latter to be fed forward. The means for releasing the jaws comprise a bent lever, $a'$, pivoted on a cross-shaft, $a^2$, and operated by the cam-disk E, itself keyed to the shaft B. When the bite of the chuck-jaws is relieved, the rod or screw-stock $a$ is advanced by the weight M, supported in the bight of the cord $m$, which is fastened at one end to the fixed rod $m'$, and at the other to the feed-rod $m^2$, which is free to slide in the slotted tube $m^3$. The front end of the said feed-rod acts against the rear of the screw-stock. The length which the rod or screw-stock is advanced when the bite of the chuck-jaws is released is determined by the length-gage L. This gage is carried on the transversely-moving carrier or cross-slide F, and is introduced in front of the rod or screw-stock whenever the latter is released, so that it stops the forward movement thereof at the right point. When the feed has taken place and the chuck has resumed its hold upon the rod or screw-stock, the length-gage is moved out of the way of the die or threading-tool. The cutter K, for turning down the rod or screw-stock to the proper diameter for threading, and the cutter I, for cutting off the thread-screws, are supported upon the same transversely-moving carrier or cross-slide, F. They are made in one piece of metal, so as to form one combined tool. This is made in the form of a disk having its periphery cut away to form the cutting-edges $k$ and $i$, Fig. 5. It is supported by a central bolt, $l$, upon the tool-post $k'$. By turning the disk on the bolt, the cutting-edges are brought into the proper position for acting upon the rod or screw-stock. Whenever the edges become dull, the tool can be reground and set up. The screw $k^6$ enables the cutters to be adjusted on the carrier or slide F. The cutter K is between the chuck and the cutter I, which latter, as usual, acts upon the rod or stock $a$ at the distance of a screw's length from the end. The carrier or slide F is moved transversely back and forth by means of a cam-groove, $r$, in the periphery of the drum E', the motion being communicated through the pin $s$, lever T, and connecting-rod $t$.

The operation is as follows: When a fresh rod or screw-stock is inserted through the chuck, the end is not allowed to strike the length-gage, but is permitted to come only within a screw's length of the same, or a little less. The cutters K I and the die D are now advanced simultaneously. The die does not come into contact with the rod or screw, because the latter does not project sufficiently from the chuck; but the cutters K I move across the same, the cutter K turns down the end to the diameter proper for threading, and the cutter I cuts off any portion which may project past it. The cutters K I are now withdrawn, and the length-gage L is by the same movement brought opposite the end of the rod or screw-stock, which is immediately released by the chuck-jaws and advanced against the length-gage. At this time the carrier or slide F is held stationary, the portion 1 2, Fig. 4, of the groove $r$ passing over the pin $s$. In the meantime the die D has been moved back to its farthest position, out of the way of the length-gage, and is held stationary, the portion 5 6 of the groove $f$ passing over the pin $f'$. As soon as the chuck resumes its hold upon the rod or screw-stock, the carrier F and the slide G are moved sharply forward by the inclines 2 3 and 6 7. The movement of the slide G brings the die D into position for acting upon the reduced end of the screw-stock. The movement of the carrier F removes the length-gage L from the path of the die and brings the cutters K I into position for acting upon the rod. The slide G and carrier I are now advanced slowly by the inclines 7 8 and 3 4, respectively, so that the die D threads the end of the rod or screw-stock, the cutter I turns a groove the distance of a screw's length from the end in order to sever the rod or screw-stock, and the cutter K turns down the stock between this groove and the chuck, to form the shank of a succeeding screw. At this time the parts occupy the positions shown in the drawings. The threading is completed and the turning down and cutting off about half done. The carrier F then continues its forward movement under the action of the incline 3 4 until the reducing and severing are completed. During this time the die has been removed from the newly-cut thread by the action of the incline 8 5, so that when the rod is severed by the cutter I the newly-formed screw is cut off and drops into a receptacle suitably placed to receive it. The carrier F is now withdrawn by the incline 41, which brings the length-gage L in front of the rod or screw-stock, ready to stop it, when, being released by the chuck-jaws, it is advanced by the weight.

The description, as before stated, relates to the best mode of carrying out the invention; but it is evident that modifications may be made in details without departing from the spirit of the invention, and that parts of the invention may be used separately. For example, a disk-tool has been described and shown for turning down and cutting off; but a forged tool—that is, a steel bar with the end properly shaped—could be used, it being held in an ordinary tool-post. The two cutters could be separate pieces, one being adapted to turn down and the other to cut off. The length-gage could be placed on the cross-slide of other machines—as, for example, on the cross-slide which carries the cutting-off tool in my patent of December 26, 1882—the cam for moving the cross-slide being shaped to give the proper movements or timing.

The die or threading-tool may be of any ordinary or suitable construction. That shown, however, is most advantageously employed.

The new mode of forming the screw could be used in machines with any ordinary or suitable feeding mechanism.

I claim the new improvements herein described, all and several, to wit:

1. In an automatic screw-machine for making screws from a long rod or screw-stock, a chuck, a turning-down tool, and a threading-tool, combined, arranged, and operating substantially as described, so as to thread the turned-down portion at the end of the rod or screw-stock, and simultaneously therewith to turn down the rod at a screw's length from the end in order to form the shank of a second screw, whereby the time heretofore consumed in threading after turning down is saved, as set forth.

2. The combination, with the chuck and the rotatory threading-tool, of the cutters arranged between said threading-tool and the chuck, the turning-down cutter on the side of the chuck, and the severing-cutter on the side of the threading-tool, said threading-tool being movable lengthwise of the screw-stock independently of the said cutters, substantially as described.

3. The combination of the machine-frame, the chuck, the cross-slide supported in ways of said frame, the turning-down and severing cutters carried by said cross-slide, the longitudinal slide, also supported in ways of said frame, and the rotatory threading-tool carried by said longitudinal slide, the cutter for turning down being arranged on the side of the chuck, and the cutter for severing on the side of the threading-tool, substantially as described.

4. The combination, with the chuck, the threading-tool, and the cutter for turning down the rod or screw-stock, arranged to act upon the same a screw's length from the end, of the mechanism for bringing the said tools into action, so that the turning down and threading proceed together, substantially as described.

5. The combination, with the chuck, the threading-tool, the cutter for turning down and the cutter for severing the rod or screw-stock, the former cutter arranged between the latter and the chuck, of the mechanism for bringing said tools into action so that the threading, severing, and turning-down operations proceed together, substantially as described.

6. The combination, with the chuck, the threading-tool, and the cutter for severing the rod or screw-stock, of the mechanism for simultaneously moving said tools, the threading-tool lengthwise of the rod or screw-stock and the cutter across the same, so that the severing takes place partly during the threading operation or in the removal of the die, substantially as described.

7. The combination, with the chuck, the threading-tool, the cutter for turning down the rod or screw-stock, and the cutter for severing the same, of the longitudinal slide carrying the threading-tool, the transversely-moving carrier supporting the two cutters, and the operating mechanism, substantially as described.

8. The combination, with the chuck, one or more cutters, and the length-gage, of the transversely-moving carrier mounted on a stationary part of the machine, and supporting both the length-gage and the said cutters, substantially as described.

9. The combination, with the chuck, of the longitudinal slide, and the threading-tool carried thereby, the transversely-moving carrier, and the length-gage and cutters carried thereby, substantially as described.

In testimony whereof I have signed this specification in the presence of two subscribing witnesses.

ALLEN JOHNSTON.

Witnesses:
J. T. HACKWORTH,
A. G. HARROW.